INVENTORS
GEORGE O'BRIEN
J. S. HUBBY
BY
Young & Quigg
ATTORNEYS

INVENTORS
GEORGE O'BRIEN
J. S. HUBBY
BY Young & Quigg
ATTORNEYS

United States Patent Office 3,579,298
Patented May 18, 1971

3,579,298
PRODUCTION OF AMMONIUM NITRATE
George O'Brien and John S. Hubby, Bartlesville, Okla., assignors to Phillips Petroleum Company
Filed Aug. 5, 1968, Ser. No. 750,327
Int. Cl. C01c 1/18
U.S. Cl. 23—103    3 Claims

ABSTRACT OF THE DISCLOSURE

An aqueous stream comprising essentially water and a minor amount of ammonia is reacted with at least enough nitric acid to produce an ammonia-free water stream containing a minor amount of ammonium nitrate, and then utilizing said ammonium nitrate-containing stream to absorb at least a portion of nitrogen dioxide gas to produce nitric acid containing a minor amount of ammonium nitrate.

FIELD OF THE INVENTION

This invention relates to Class 23, Chemistry; Subclass 103, Compounds, Salts, Nitrogen, Nitrates, Ammonium. This subclass also covers specifically the production of ammonium nitrate. The production of ammonia relates to Subclass 199 and the production of nitric acid relates to Subclass 162 of said Class 23.

DESCRIPTION OF THE PRIOR ART

A preliminary search did not report any pertinent art. The ammonia plant portion of this ammonium nitrate production is shown in U.S. Pat. 2,610,106 to Gray, patented Sept. 9, 1952, while the nitric acid plant portion is shown in U.S. Pat. 2,697,652 to Ribble et al., patented Dec. 21, 1954. To aid those reading this application, parts taken from Gray are given reference numbers limited from 3 to 99, parts taken from Ribble et al. are given reference numbers limited from 101 to 199, and parts added to make the new combination of the present invention are given reference numbers limited from 201 to 299, not all numbers in each group being used.

SUMMARY OF THE INVENTION

The invention lies in the discovery of a problem and then in the discovery of a solution to the problem.

The problem is that in the operation of an ammonia-producing plant as in Gray, cited, a large amount of condensed steam and combustion-created water is produced, which water is contaminated with 200 to 2000 parts per million by weight of the water, and generally 400 to 1000 parts per million by weight of the water, of ammonia. This water must be disposed of, but cannot just be dumped in streams without first removing the ammonia. This low concentration of ammonia can be removed by steam stripping, but the value of this ammonia is much less than the cost of stripping it out. In a nitric acid plant as in Ribble et al., cited, water is needed to absorb the nitric oxide and nitrogen dioxide gases to form nitric acid.

If the nitric acid is to later be reacted with ammonia to form ammonium nitrate, it would seem obvious that the ammonia-contaminated quench water produced by Gray, cited, could be used in the absorption step of Ribble et al., cited. However, the fact is that the absorption of $NO_2$ and instant creation of NO is a never-ending process in the absorption step, as the NO is oxidized to $NO_2$ and the $NO_2 + H_2O$ gives nitric acid and more NO. If ammonia is present, it reacts with the NO to form ammonium nitrite, which will not react with the nitric acid but which is a very unstable compound, decomposing in hot water well below 212° F., which ammonium nitrite will move up or down the absorption column, recomposing and depositing in pipes or vessels connected to the gas exit of the absorption column, or possibly getting into the final product. Anywhere the ammonium nitrite deposits, it will be intolerable because it is liable to spontaneous decomposition, which may well be hazardous.

This solution of this problem that comprises the present invention is to add enough nitric acid produced by the nitric acid production process to the ammonia-contaminated water produced by the ammonia production process to convert all the ammonia therein into ammonium nitrate before adding the same to the nitric acid absorption column of the nitric acid production process, and then no ammonium nitrite can be produced. The nitric acid produced containing some ammonium nitrate may be used as such, or may pass to a step where it is reacted with more ammonia to form ammonium nitrate free of ammonium nitrite. There will be no ammonium nitrite formed or deposited anywhere in the system.

This ammonia-contaminated water produced by the water quench to the synthesis gas shift converter of the ammonia plant may also contain minor amounts of other gases, such as oxygen, nitrogen, argon, hydrogen, carbon dioxide, carbon monoxide, helium, neon, methane, which constituted chiefly from 200 to 2000 parts per million by weight of the water of carbon dioxide but as these gases all pass out of the top of the nitric acid absorption tower without reaction, the ammonia-contaminated water stream may be said to consist essentially of water and ammonia, as they are the only compounds that react in the acid absorption tower.

DESCRIPTION OF THE PREFERRED EMBODIMENT

Figure 1:
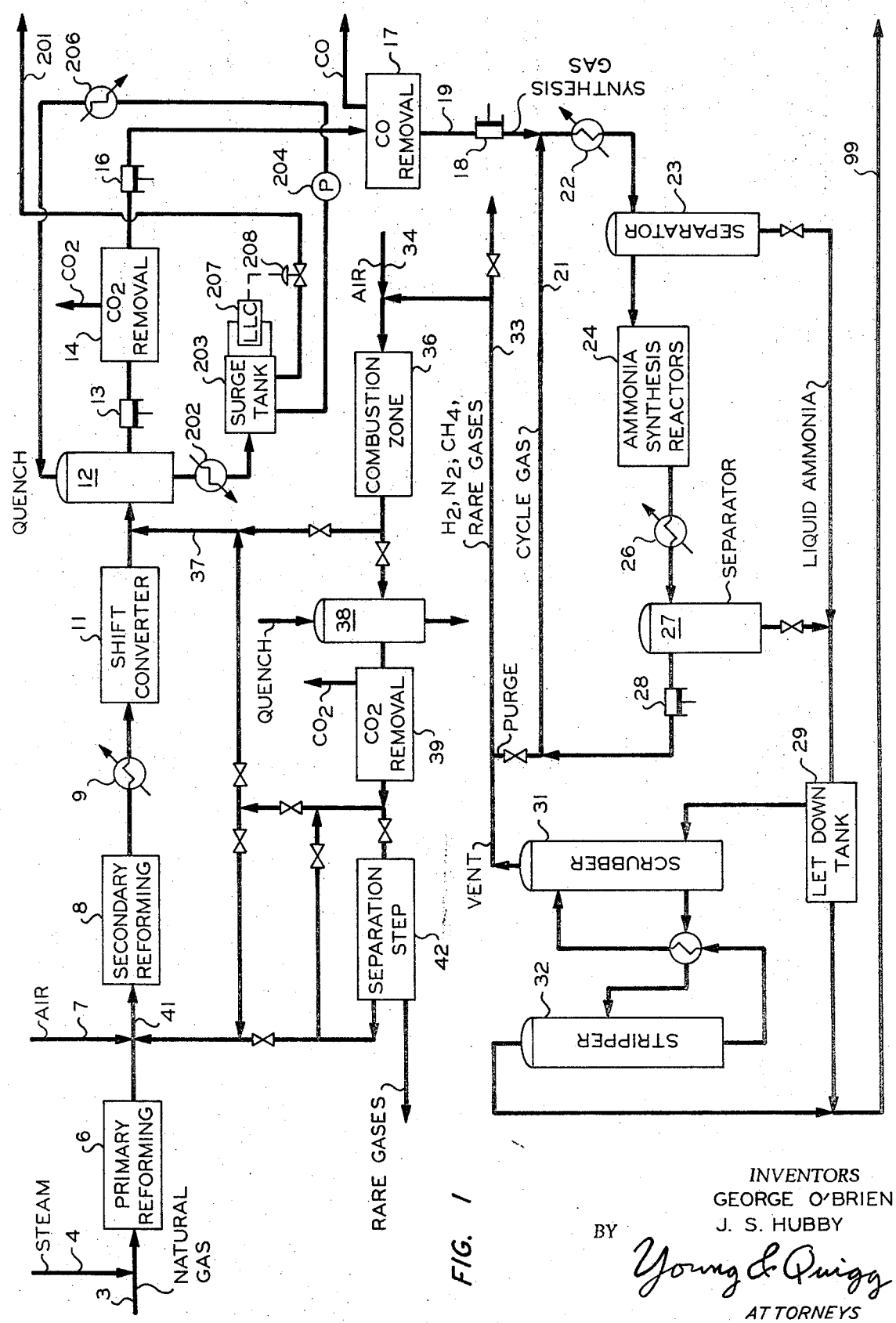
FIG. 1 is a flow diagram of a plant for the production of ammonia of the type shown by U.S. Pat. 2,610,106 to Gray, cited. The ammonia produced flows through line 99 and the ammonia-contaminated quench water flows through line 201 into FIG. 2 where nitric acid and then ammonium nitrate is produced.

In FIG. 1, a hydrocarbon gas 3, ordinarily a methane-rich gas such as natural gas, is reacted with a large quantity of excess steam 4 in contact with a reforming catalyst such as reduced nickel oxide at a temperature which may be in the range of 700 to 750° C. to convert most of the hydrocarbon to hydrogen, carbon monoxide, and some carbon dioxide. This is accomplished in 6 in what is known as a primary reforming step. Air 7 is then introduced to the hot gases in a quantity sufficient to supply the nitrogen required in the ammonia synthesis and the resulting mixture passed through what is known as a secondary reforming step 8, wherein the oxygen of the air reacts with hydrogen and with a portion of the residual methane content of the primary reformed gas, preferably in the presence of a catalyst, for example the same type of catalyst as used in the primary reforming zone. Because of the large amount of hydrogen present in the secondary reforming step, further reduction of the methane content of the gas by direct combustion with the oxygen of the air is difficult. The gases are next cooled somewhat in 9 and passed through a shift converter 11 in contact with a suitable catalyst, such as iron oxide, wherein the water gas shift reaction occurs between water and carbon monoxide forming hydrogen and carbon dioxide. The gases are next quenched in 12, compressed somewhat in 13, and then passed into contact with a suitable medium for removing carbon dioxide, preferably a 10 to 25% aqueous solution of monoethanolamine in 14. After further compression in 16, the small amount of residual carbon monoxide is removed by any suitable means, for example by contacting the gases with a cuprous solution in 17. The resulting material is composed essentially of 3 parts of hydrogen to 1 part of nitrogen, together with undesired but necessarily present small amounts of residual methane and any helium, argon, and other insert gases present in the starting gases. This fresh synthesis gas is given the final compression in 18 to the ammonia synthesis reaction pressure as described below.

In the synthesis of ammonia by reaction of hydrogen with nitrogen, a synthesis gas 19 containing hydrogen and nitrogen in the approximate ratio of 3:1 is obtained from any suitable source, preferably that described above. This gas is compressed to a high pressure, for example 5000 p.s.i.g., in 18 and after admixture with cycle gases 21 containing unreacted hydrogen and nitrogen from the process the mixed gas is heated in 22, ammonia separated in 23, and is passed in contact with a suitable metallic catalyst, such as iron, at known conditions, for example 450–550° C. in 24. The effluent gases are cooled in 26 to condense out ammonia product as a liquid in 27. The remaining unreacted gas, also containing gases introduced to the system in the synthesis gas which are inert in the reaction, for example methane, helium, argon and other rare gases, is compressed in 28 and returned as cycle gas to admixture with the fresh synthesis gas. Often this admixed gas is first subjected to cooling and separation of condensed ammonia prior to its introduction to the synthesis reactors, thus minimizing the ammonia content of the gases introduced to the reaction. The liquid ammonia collected at one or both points as described is passed into what is known as a letdown tank 29, wherein the pressure is descreased to a value not greatly in excess of atmospheric. Gases are recovered from this letdown tank, scrubbed in 31 and 32 with water to recover ammonia therefrom, and ordinarily vented to the atmosphere, although these gases are composed largely of hydrogen and nitrogen. In order to avoid a buildup in the cycle gas of gases inert to the reaction, i.e. methane and rare gases, to such an extent that their partial pressure effect becomes deleterious in the reaction, a portion of the cycle gas is intermittently or continuously purged from the system. This cycle gas likewise is composed largely of hydrogen and nitrogen, but also contains the aforesaid inert gases in total amounts which may range in the neighborhood of 20 percent.

In accordance with a preferred embodiment of our invention, the purged cycle gas and/or the vent gas 33 from the ammonia letdown system 31 is admixed with the quantity of air 34 stoichiometrically required to convert all of the hydrogen and methane present therein to water and carbon dioxide. The admixture is subject to combustion conditions, either at fairly high temperatures in the absence of a catalyst or at somewhat lower temperatures in the presence of a catalyst in 36. By this means the methane content of the gases in question, which normally runs as high as 10% or even higher, is readily destroyed. Furthermore, all of this methane, together with all of the hydrogen present in the gases being treated, is effectively utilized in removing oxygen from the introduced air, thereby supplying the maximum possible quantity of oxygen-free nitrogen in the gases resulting from the combustion. Inasmuch as there is no objection in this step to the complete combustion of hydrogen, it is quite simple to burn simultaneously all of the methane. Furthermore, all of the nitrogen present in the vent and/or purge gases thus treated is now present in a usable form uncontaminated with methane and also admixed with the nitrogen introduced from the air. The mixture of gases resulting from our treatment of purge and/or vent gases, in addition to water, is composed solely of nitrogen plus any rare gases present in said purge and vent gases. This mixture of gases 37 is now introduced into the synthesis gas preparation part of the process at one of several suitable points, but in any event in a low pressure stage thereof. We prefer to introduce the gas mixture to the process immediately after the shift converter 11, whereby the treated gases, still hot from the combustion, are first quenched then partially compressed and passed to $CO_2$ removal. The gas, admixed with the fresh synthesis gas being made, passed on through further compression, CO removal, and final compression to ultimate reuse in the ammonia synthesis reaction. As an alternative, our hot gases resulting from the controlled combustion of purge and/or vent gas with controlled quantity of air are first quenched in 38 and passed through a separate $CO_2$ removal step 39, wherein they are scrubbed with a monoethanolamine solution or otherwise treated for removal of $CO_2$ therefrom. The resulting gas composed entirely of nitrogen plus small amounts of rare gases is then introduced into the synthesis gas preparation portion of the process, either to admixture with the feed 41 to the secondary reformer, or immediately after the shift converter.

Inasmuch as our process as described up to this point makes no provision for the removal of rare gases, although it does provide a highly satisfactory removal of methane, a limited quantity of the cycle gas and/or vent gas must still be purged to the atmosphere in order to avoid a pyramiding of these rare gases in the system. However, if economically justified, even this purge can be avoided by subjecting our combustion gases, after removal of $CO_2$ therefrom, to treatment for segregation of the nitrogen content thereof from the rare gas content thereof. This may take the form of adsorption of the nitrogen on activated charcoal or other solid adsorbent in 42 with the rare gases passing through unadsorbed and being recovered for any desired use or discarded, followed by desorption of the nitrogen.

Figure 2:
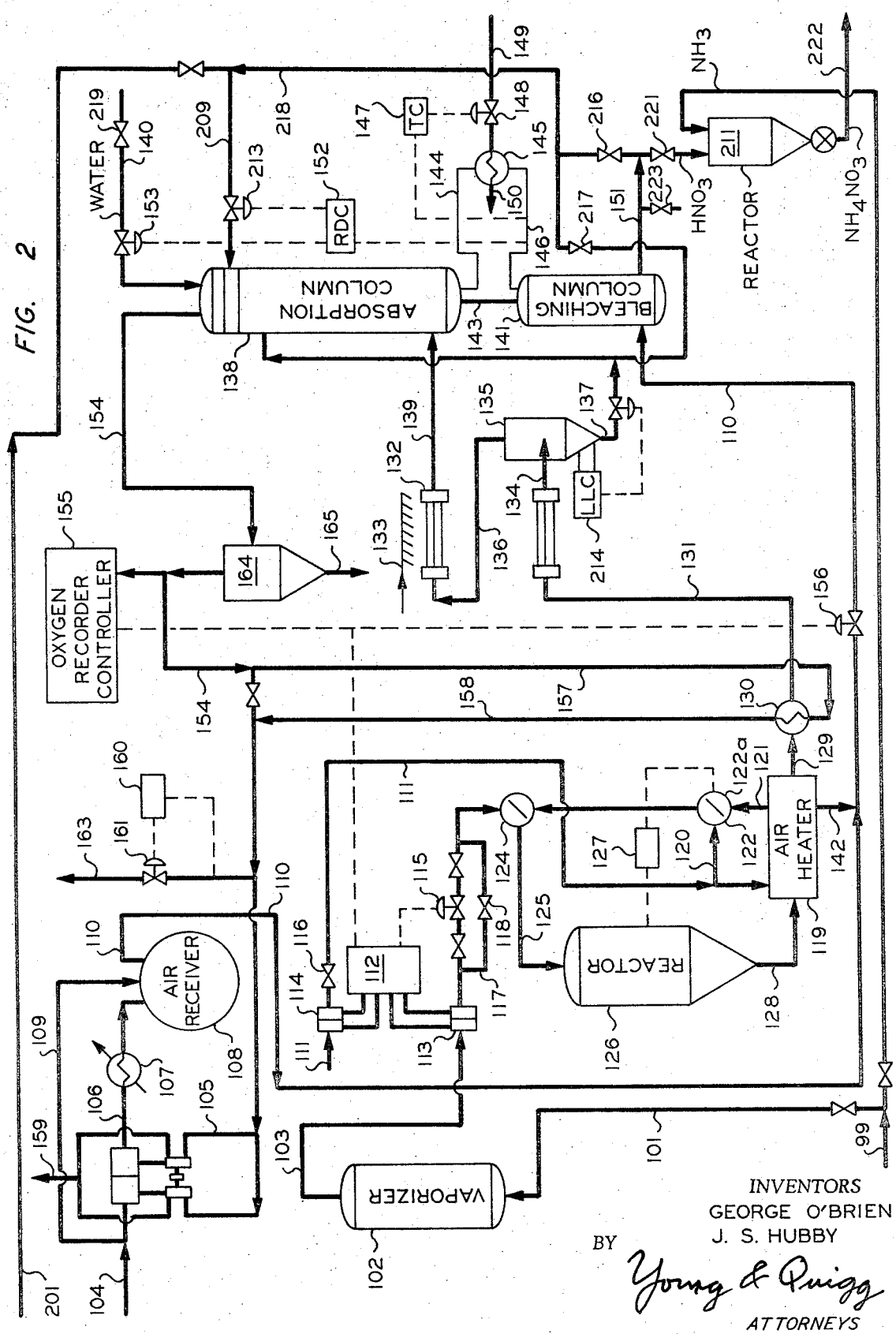
FIG. 2 is a flow diagram of a plant for the production of nitric acid of the type shown by U.S. Pat. 2,697,652 to Ribble et al., cited, which receives ammonia through line 99 and ammonia-contaminated quench water through line 201 from FIG. 1, produces nitric acid containing some ammonium nitrate in line 151, and converts the nitric acid and ammonia into ammonium nitrate.

In FIG. 2, ammonia from line 99 enters the system via line 101 and passes to vaporizer 102, provided with steam coils or other suitable means for heating and vaporizing the ammonia. Ammonia gas leaves vaporizer 102 via line 103 for mixing with air prior to entrance into the oxidation reaction. Air enters the system via line 104, and at least a portion thereof passes into power recovery compressor 105 wherein the expansion of the residual gases or off-gases from the system is employed to compress the air supplied to the system. Compressed air from compressor 105 passes via line 106 to cooler 107 and thence to air receiver 108. Any air entering the system that is not passed through compressor 105 is passed to receiver 108 directly via line 109. Air from receiver 108 is withdrawn and passed via line 110, and a portion thereof is passed via line 111 to the ammonia oxidation reaction. In actual operation the air in line 110 is at a pressure of about 105 pounds per square inch gauge and a temperature of 49° C., and the ammonia in line 103 is at a pressure of about 160 pounds per square inch gauge and a temperature of 71° C.

The ammonia and air from the oxidation reaction passing via lines 103 and 111 respectively are mixed prior to entrance into the oxidation reaction as described hereinbelow. To effect the oxidation reaction the ratio of ammonia to air in the reaction mixture is closely controlled in order to obtain maximum conversion efficiency and to minimize the danger of the formation of explosive mixtures. Air-ammonia mixtures containing less than 8 or more than 10.5 volume percent ammonia show too low a conversion efficiency, and the preferred concentration of ammonia in the air-ammonia mixture is within the range of 9.5 to 10.3 volume percent. In order to control the air-ammonia mixture within these limits, a ratio control device is employed to proportion the volume of the ammonia gas passing via line 103 to the volume of process air passing via line 111. Any suitable means for controlling the volumetric ratio of air to ammonia may be used. For example, in some instances a single differential ratio flow controller is satisfactory. We prefer to employ a recorder receiver flow controller, shown on the drawing as controller 112, to accomplish the desired control. Controller 112 is set to maintain a concentration of ammonia of 9.5 to 10.3 volume percent in the air-ammonia mixture, and this setting is automatically adjusted within this range in accordance with the oxygen content of the off-gas from the system in a manner to be described hereinbelow. Lines 103 and 111 are provided with flow transmitters 113 and 114 respectively, and these transmitters are connected directly to controller 112. Accordingly, the flow rates in lines 103 and 111 are transmitted to controller 112 which operates motor valve 115 in ammonia line 103 either electrically, mechanically or pneumatically. For each change in the flow rate in air line 111, as transmitted to controller 112 by transmitter 114, controller 112 automatically adjusts the ammonia flow rate in line 103 to maintain a constant air-ammonia mix. Thus the desired air-to-ammonia ratio is maintained constant at all flow volumes within the range of the measuring instruments. It is desirable to employ a flow controller that operates over a wide range in order that ratio control is obtained with the low flow rates at start-up as well as the high flow rates at maximum production. Line 111 is provided with valve 116 which is employed to manually control the air flow rate in that line. Ammonia line 103 is provided with by-pass line 117 and valve 118 which is ordinarily employed when the ammonia flow is on manual operation. Such operation is employed when the process is being started or when the required ammonia volume exceeds the capacity of motor valve 115.

Prior to being mixed with ammonia, the air for the oxidation reaction is conducted via line 111 to air heater 119 for preheating of the air. In heater 119 the air is passed into heat exchange relationship with the effluent from the oxidation reaction. A portion of the air in line 111 passes to mixer 122 via line 120 without passing through heater 119, and consequently this portion of air is not preheated. The remaining air for the oxidation reaction enters heater 119, and its temperature is elevated therein. The heated air is withdrawn from heater 119 via line 121, and this air, as well as the air in line 120, is passed to mixer 122 containing damper 122A. The adjustment of damper 122A is controlled by the catalyst temperature in the oxidation reactor in order to obtain the desired preheat tempertaure of the air for the oxidation reaction. After mixing of the hot and cooler air in mixer 122, the air passes via line 123 to mixer 124 where it is admixed with the ammonia to be oxidized. In view of the operation of controller 112, previously described, air and ammonia are admixed in mixer 124 in the proper volumetric proportions for the oxidation reaction. Admixed air and ammonia pass via line 125 to oxidation reactor 126.

Reactor 126 is provided with a suitable catalyst for effecting the oxidation reaction. The preferred type of catalyst is a platinum catalyst. Platinum alone or platinum in an alloy with a noble metal, such as copper, nickel, cobalt, silver, tungsten, vanadium and the like, may be employed. The preferred type of catalyst is a platinum-rhodium alloy containing about 10 percent rhodium. This latter catalyst is usually used in the form of an 80-mesh gauze with the gauze in either single or multiple layers. Actually, various physical forms of the catalyst may be used instead of the wire gauze form. For example, the catalyst may be in the form of perforated sheets, narrow strips of metallic turnings, impregnated masses, and the like. The wire gauze type is preferred, and it may be in any suitable form, such as cylindrical baskets, flat sheets, and the like.

In reactor 126 ammonia is oxidized with air in accordance with the following equation:

$$4NH_3 + 5O_2 \rightarrow 4NO + 6H_2O$$

The reaction is exothermic and it may start at a temperature as low as 500° C. Temperature increases favor the formation of nitric oxide, but a temperature above 970° C. the formation of nitrogen as a product of the reaction is increased. The nitrogen forms as a result of the oxidation of ammonia to water and nitrogen instead of nitric oxide. Reaction temperatures within the range of 900 to 970° C. are employed, and the minimum allowable conversion of ammonia is 96 percent. Conversion rates increase with reaction temperature up to 950 to 960° C., at which temperature conversion rate increases become negligible. It is preferred not to operate at temperatures above 930° C., except for short periods of time, due to the catalyst losses at higher temperatures. The most preferred temperature is within the range of 900 to 910° C. Since high pressures tend to increase the formation of nitrogen at the expense of the desired nitric oxides, pressures in excess of 125 pounds per square inch are usually not employed.

The temperature in reactor 126 is maintained within the desired temperature by controlling the preheat temperature of the air prior to its admixture with ammonia. A temperature-responsive device, such as a Chromel-Alumel thermocouple, is placed in the wire gauze catalyst or slightly below it. The device is connected to recording temperature controller 127 which by electrical, mechanical or other suitable means adjusts damper 122A in mixer 122. Whenever the gauge temperature in reactor 126 fluctuates from a predetermined temperature within the range already discussed, controller 127 adjusts damper 122A in a manner that the preheat temperature of the air flowing in line 123 is increased or decreased, as the case may be. If the temperature in reactor 126 becomes too high, damper 122A is adjusted to admit more cool air via line 120 and less hot air via line 121. On the other hand, if the temperature in reactor 126 becomes too low, damper 122A is adjusted to admit more hot air via line 121 and less cool air via line 120, and thus the preheat temperature of the air-ammonia mixture is increased with a resulting increase in the reactor temperature. The temperature of the preheated air is usually adjusted to maintain the preheat temperature of the air-ammonia mixture within the range of 280 to 310° C., although high and lower preheat temperatures may be used.

The gaseous effluent leaving the gauze catalyst in reactor 126 contains by volume about 10 percent nitric oxide and about 7 percent oxygen in addition to steam and nitrogen, and the gas is at a temperature of about 900° C. The lower portion of reactor 126 is surrounded by a cooling jacket that cools the gaseous reaction effluent to about 750° C. The reaction effluent is withdrawn from reactor 126 via line 128 and thence via heater 119 where it serves to preheat the air for the oxidation reaction. In air heater 119 the reaction effluent is cooled to about 500° C. From heater 119 the gaseous effluent is withdrawn via line 129 and then it is further cooled to about 300° C. by passage through heat exchanger 130 in heat exchange relationship with a part or all of the off-gas from the system. Effluent gases are withdrawn from heat exchanger 130 via line 131 to condenser 132 where the effluent is further cooled to a temperature no higher than 150° C. Condenser 132 is a series of cooling tubes over which water is flowed to absorb heat and effect the necessary cooling. Upon being cooled to a temperature no higher than 150° C., the nitric oxide in the reaction effluent is oxidized by the oxygen also present in that effluent in accordance with the following equation:

$$2NO + O_2 \rightarrow 2NO_2$$

This reaction is exothermic, and it is necessary for the cooling water flowing over the condensing tubes to remove this heat as well as to cool the reaction effluent. Water to effect the heat removal in condenser 132 enters the system via line 133 and thence it flows downwardly over the condenser tubes. About 90 percent of the nitric oxide entering condenser 132 is oxidized to nitrogen dioxide, which reacts with water in the oxidation effluent to form nitric acid in accordance with the following equation:

$$3NO_2 + H_2O \rightarrow 2HNO_3 + NO$$

This reaction is also exothermic and it forms additional quantities of nitric oxide to be oxidized with oxygen to nitrogen dioxide.

At an intermediate point in condenser 132 the oxidation effluent passing therethrough is passed via line 134 to acid separator 135 where weak nitric acid is separated and gaseous oxidation effluent is returned to condenser 132 via line 136. Weak nitric acid is withdrawn from separator 135 via line 137, and it is introduced to absorption column 138 on that plate or tray which contains nitric acid of the same strength as that in line 137. Introduction of the weak acid at a lower point in column 138 causes a dilution of the nitric acid product, and introduction of the weak acid at a higher point in the column places an excessive burden on the top of the column and it leads to high yield losses in the stack or off-gases.

Effluent from condenser 132 is withdrawn via line 139 and then passed to absorption column 138. In actual operation the feed to column 138 is at a temperature of about 30° C. Column 138 is a bubbler cap absorption column containing a series of plates or trays, and the water or steam condensate is introduced to the top of the column via line 140. The water passes down through the column where it reacts with nitrogen dioxide to form nitric acid and where it absorbs the nitric acid thus formed. The reaction of nitrogen dioxide and water forms nitric oxide, and this nitric oxide as well as the nitric oxide entering the column via line 139 is oxidized to nitrogen dioxide for further reaction with water. Column 138 is operated at the lowest temperature obtainable with ordinary cooling water, usually within the range of 20 to 40° C., and the pressure in column 138 is about 80 pounds per square inch.

The nitric acid withdrawn from column 138 contains some nitric oxide, and consequently the acid has a slight brownish color. In order to remove this color the acid is passed to bleaching column 141 to which air is introduced for oxidation of the nitric oxide to nitrogen dioxide. Column 141 is a ring-packed column connected with column 138. Nitric acid trickles over the packing against the upward flowing air stream which passes up into column 138 for oxidation of nitric oxide therein. Thus, air entering column 141 is employed to oxidize nitric oxide in column 141 and in column 138.

The bleaching action in column 141 is effected at a temperature above that at which column 138 is operated and usually within the range of 40 to 50° C. To obtain this temperature the air flowing in line 110 and entering column 141 is heated by withdrawing via line 142 a portion of the air entering and preheated in air heater 119. Sufficient air is withdrawn in line 142 to raise the temperature of the air flowing in line 110 to that necessary to produce the desired temperature in column 141. This method of operating has a disadvantage in that it changes the ratio of ammonia to air in the feed to reactor 126 after the feed mixture has been automatically adjusted to a predetermined ratio by controller 112. Controller 112 can be set to compensate for the withdrawal of air via line 142, but each time a change occurs in the rate of withdrawal via line 142, it is necessary to adjust controller 112 accordingly. When the air entering column 141 is preheated, as described, nitric acid passes from column 138 to column 141 via line 143. However, we prefer to operate our process by introducing cold air to column 141 and without removing air from heater 119 via line 142. In our preferred method of operation, nitric acid is withdrawn from column 138 via line 144, and it is then passed to steam heater 145 where it is heated to a temperature of 40 to 50° C. prior to passage into column 141 via line 146. A temperature-responsive device in line 146 is connected to temperature controller 147 which operates motor valve 148 in steam line 149. In this manner the quantity of steam entering heater 145 is automatically controlled in such a manner that the temperature of the heated nitric acid is within the desired limits. Steam condensate is removed from heater 145 via line 150. It is desirable to maintain the temperature of the nitric acid passing to column 141 below 50° C. in order that the corrosive effect of the acid is kept at a minimum. Bleached nitric acid is withdrawn from column 141 via line 151 as a product of the process.

In order that the nitric acid produced in our process can have the desired concentration, the quantity of water or steam condensate entering the system via line 140 is automatically controlled. To effect this control, recording density controller 152 is connected to line 146 and valve 153 in line 140. Whenever a change occurs in the density of the nitric acid in line 146, indicating a change in concentration, controller 152 adjusts the setting of valve 153 to increase or decrease, as the case may be, the quantity of water entering column 138 via line 140 in order that the concentration of the nitric acid may be decreased or increased, as desired. In this manner, any acid concentration can be obtained. Usually the concentration is at least 50 percent, preferably at least 60 percent, and more preferably 62 to 66 percent.

Gaseous effluent from column 138, containing nitrogen, oxygen and nitrogen oxides, is withdrawn via line 154. For efficient operation of our process, it is essential that the oxygen content of the effluent from column 138 be maintained within close limits, preferably not above 5 volume percent, and more preferably within the range of 2 to 3 volume percent. When the oxygen concentration drops below 2 volume percent, excessive amounts of nitrogen oxides are lost in the gaseous effluent from column 138, and when the oxygen concentration rises above 5 volume percent the power costs for operation of the system become excessive. Thus, the oxygen content of the gaseous effluent must be rigidly controlled.

We have found that the oxygen content of the effluent gas from column 138 can be employed to control automatically the oxygen consumption in the system. As a consequence of the control of the oxygen consumption in the system, the oxygen content of the effluent gas is maintained within the desired limits for efficient and economical operation. Control of the oxygen consumption in the system can be effected by two methods, i.e., the ratio of ammonia to air in the reaction mixture entering reactor 126 can be automatically controlled or the quantity of air entering column 141 can be automatically controlled. To operate an ammonia oxidation process in accordance with our invention, we employ oxygen recorder controller 155 in line 154. This controller produces a continuous record of the oxygen content of the effluent gas from column 138, and it is connected to either controller 112 or valve 156 in line 110, either of which is activated by controller 155, whenever the oxygen content of the effluent gas is outside the desired limits. The activation of controller 112 or valve 156 is by either electrical, mechanical or pneumatic means.

In one embodiment of our invention the amount of air entering column 141 via line 110 and valve 156 is automatically controlled in accordance with the oxygen content of the gas in line 154. Controller 112 is set to obtain the desired air-ammonia mixture, and reactor 126 is operated at the reaction conditions set forth above. Accordingly, whenever the oxygen content of the effluent gas in line 154 exceeds or falls below the desired limits, this oxygen content is an indication that either too much or too little oxygen is entering column 141 for oxidation of nitric oxide in columns 138 and 141. Therefore, controller 155 automatically adjusts valve 156 to increase or decrease, as the case may be, the rate of flow of air to column 141 until the oxygen content of the effluent gas returns to the desired concentration. The setting of valve 156 remains as so adjusted until a further adjustment is necessitated by a variation in the oxygen content recorded by controller 155.

In another aspect of our invention, oxygen recorder controller 155 is employed to adjust the setting of controller 112. In this aspect the flow or air to column 141 via line 110 is manually adjusted to permit the entry of sufficient oxygen to oxidize nitric oxide in column 141 and to obtain a substantially water-white or straw-color product therefrom. Then, when the oxygen content of the effluent gas in line 154 exceeds the desired upper limit, controller 155 adjusts the setting of controller 112 to increase the ammonia concentration of the air-ammonia mixture for the oxidation reaction, and consequently the concentration of excess oxygen in line 154 is decreased. On the other hand, when the oxygen content of the effluent decreases to less than the desired minimum limit, controller 155 adjusts the setting of controller 112 to decrease the ammonia concentration in the feed to reactor 126, and consequently the concentration of excess of oxygen in line 154 is increased. Since the ammonia oxidation reaction is exothermic, any increase or decrease of the ammonia concentration in the feed to the reaction will have an effect upon the reaction temperature in reactor 126. In our process, any such temperature effect is compensated for automatically by controller 127 adjusting the preheat temperature of the inlet air for the reaction.

A portion or all of the effluent gas passing via line 154 is passed via line 157 to heat exchanger 130, and it is then returned to line 154 via line 158. Thus, the effluent gas serves to cool the reaction gases from the oxidation reaction prior to passage of the former via line 154 to power recovery unit 105, where it serves to compress the inlet air to the system. In actual operation, the use of power recovery unit 105 on the exhaust gas from the system decreases the over-all power consumption for the process by as much as 50 percent. Exhaust gases from the system are vented via line 159.

Since the gaseous effluent from column 138 contains some nitric acid, line 154 is provided with separator or mist collector 164 for separation of nitric acid via line 165 in order to prevent corrosion of equipment, particularly power recovery unit 105, by this nitric acid.

In the operation of the disclosed process, it is important that variations in pressure be kept at a minimum, primarily to reduce variations in the operating conditions of reactor 126 and also to assure a constant pressure to the power recovery unit for its operation. It is essential that the pressures of the air and ammonia entering the oxidation reactor be maintained at a constant value, since variations in one or the other of these feed pressures affect the respective volumes entering the reactor and seriously affect the proper operation of controller 112. In order to insure a minimum pressure variation in the system, line 154 is provided with recording pressure controller 160 which automatically controls the setting of valve 161 and thus maintains a constant back pressure on the system within the range of 75 to 120 pounds per square inch. After passage through valve 161, effluent gases are vented from the system via line 163. In actual operation, there is a pressure drop through the system, and this pressure drop acts as a reducing valve to smooth out any variations in pressure. The minimum pressure drop that should be maintained is 15 pounds per square inch in order to minimize effects upon the temperature in reactor 126 caused by variations in pressure.

In making the present invention, in FIG. 1 we found that quench 12 in the ammonia producing plant was causing a great deal of expense and trouble. It will be noticed that the addition of steam 4 and the burning of natural gas 3 with air 7 is forming a lot of water in reforming steps in 7 and 8 and shift converter 11, which water can, of course, be removed at 201. This quench water is too badly contaminated with about 200 to 2000 parts per million of ammonia to allow it to be dumped into a natural stream of water and thereby contaminate it. However, it is too lean in ammonia content to make any recovery of the ammonia economic. Therefore, while we had to strip the ammonia out of the water with steam before we could throw away the water, this stripping was expensive and the ammonia recovered was not worth the cost and difficulty of steam stripping.

As we are also making nitric acid, which requires water 140 to absorb the nitric acid in the absorption tower 138, why not use the ammonia-contaminated quench water 201 to supplement or replace water 140 for this purpose. This does not solve the problem, however, because in tower 138 there is always NO gas present which will form unstable ammonium nitrite $NH_4NO_2$ with some of the ammonia present.

Ammonium nitrite decomposes in hot water, and if allowed to form would decompose and pass out the top of tower 138 and reform and deposit in such cooler equipment downstream as pipe 154, separator 164, and pipes 105 and 159 as spontaneously decomposable deposits. If any ammonium nitrite should ever pass downstream through tower 138 and finally end up in the ammonium nitrate product, that would also be very bad. This is because while ammonium nitrate will not decompose below 410° F., ammonium nitrite will decompose somewhere below 210° F. and is liable to do so spontaneously. This would be bad to have in ammonium nitrate, especially if later mixed with fuel oil for use as an explosive compound.

These unsolved problems were all solved by the present invention, in which quench water in 12 is recycled through cooler 202, surge tank 203, pump 204, cooler 206 and back to quench 12, the excess water being collected with its content of from 200 to 2000 parts per million of ammonia and removed from tank 203 by means of liquid level control 207 opening valve 208, allowing flow through pipe 201 into FIG. 2.

In FIG. 2 the ammonia-containing water 201 is contacted with enough nitric acid at 209 to turn all the ammonia into ammonium nitrate before it reaches column 138. Therefore, ammonium nitrite will never have a chance to form and the solution of nitric acid and ammonium nitrate will move down column 138, through bleaching column 141, and line 151 into reactor 211. More ammonia from line 99 is added in reactor 211 to form more ammonium nitrate with the nitric acid 151.

An analysis of ammonia-contaminated stream 201 shows it to contain 2.2 moles per hour of $NH_3$, 1.8 moles per hour of $CO_2$ and 3,282 moles per hour of water. This amounts to between 200 to 2000 parts per million by weight of the water of $NH_3$ and about the same amount of $CO_2$, with traces of other gases. As the $CO_2$ and other gases are inert when introduced into nitric acid absorption tower 138 and merely pass out pipe 154 at the top of the tower without reaction therein, the stream 201 can be said to consist essentially of water and 200 to 2000, preferably 400 to 1000, parts per million by weight of the water of ammonia. The carbon dioxide and other gases inert to the reactions in tower 138 can be ignored and not mentioned in the claims.

Mixing 2.2 moles per hour of ammonia and 1.8 moles per hour of carbon dioxide with 3,281 moles per hour of water produces about 700 and 1500 parts per million by weight of the water of the ammonia and the carbon dioxide, respectively.

Recording density controller 152 controls both water 140 and ammonium nitrate dilute water solution 209, which may contain some excess nitric acid, by means of valves 153 and 213, respectively. The majority of water added to column 138 is ammonia-contaminated water 201, which forms 55 to 95% of the absorption water, preferably about 75% of the total water. Pure water 140 forms the remaining 5 to 45% of the water, preferably 25% of it. By adding pure water 140 on the top tray of the absorption tower 138 and the ammonia-containing water on a lower tray, preferably on the fourth tray from the top, there is substantially no chance of ammnoium nitrate going up through the top tray into pipe 154.

Liquid level control 214 merely controls the flow of liquid dilute acid out pipe 137. Either concentrated nitric acid from valve 216 or dilute nitric acid from valve 217, or a mixture of both, may be added through line 218 to pipe 209. Preferably, a weak acid containing 42 to 47% by weight $HNO_3$ is employed. By closing valve 219, the invention can be practiced without the use of pure water 140, as the ammonium nitrate in water 209 is dilute and most of it will go down tower 138. Ammonium nitrate deposits in the top of tower 138 would not be objectionable, as would ammonium nitrate deposits. It is preferred, however, to use some pure water 140.

The whole combination is made economically practical because the major portion of the nitric acid in line 151 is being added through valve 221 into a reactor 211 where it is reacted with ammonia from line 99 to form ammonium nitrate product at 222. Some nitric acid can be withdrawn through valve 223 for other purposes not inconsistent with its containing a minor amount of ammonium nitrate.

The utility of the products produced by the processes of this invention are believed too numerous and too obvious to warrant any detailed discussion. Ammonium nitrate is an article of commerce used chiefly as fertilizer for helping plants grow on farms. Much ammonium nitrate is also mixed with any hydrocarbon oil and used as explosive compounds in blasting. Nitric acid is an article of commerce useful to react with toluene and form tri-nitrotoluene, an explosive, and is useful to react with ammonia to make ammonium nitrate, useful as explained above. Nitric acid containing a minor amount of ammonium nitrate is obviously useful in reacting with ammonia to form ammonium nitrate. Many other uses for nitric acid, nitric acid containing minor amounts of ammonium nitrate, and ammonium nitrate are obvious and are fully described in the vast prior art available at present on these compounds. No attempt to itemize all these utilities need be made at present.

This invention is not limited to the above description of an illustrative embodiment theerof, as it will be evident to those skilled in the art that modifications may be made without departing from the spirit or scope thereof.

Having described our invention, we claim:

1. A process for treating an aqueous stream having ammonia present therein which comprises contacting said stream with nitric acid in an amount sufficient to form a second stream comprised of ammonia-free water containing a minor amount of ammonium nitrate, contacting said second stream with nitrogen dioxide gas to form a third stream comprised of nitric acid containing a minor amount of ammonium nitrate, and thereafter contacting said third stream with ammonia to produce ammonium nitrate.

2. The process of claim 1 wherein said aqueous stream contains 200 to 2000 parts per million by weight ammonia.

3. The process of claim 2 wherein said aqueous stream is an ammonia contaminated water stream produced in an ammonia plant.

References Cited

UNITED STATES PATENTS

| | | | |
|---|---|---|---|
| 1,217,247 | 2/1917 | Washburn | 23—162X |
| 1,330,136 | 2/1920 | Partington et al. | 23—103 |
| 2,102,136 | 12/1937 | Shapleigh | 23—103 |
| 3,453,071 | 7/1969 | Schmitt et al. | 23—103 |

OSCAR R. VERTIZ, Primary Examiner

G. O. PETERS, Assistant Examiner